March 1, 1955     C. E. DAVIS     2,702,996
BELL HOUSING COVER

Filed Aug. 31, 1954

C. Edward Davis
INVENTOR.

BY 12,702,996
Patented Mar. 1, 1955

United States Patent Office 2,702,996

BELL HOUSING COVER

C. Edward Davis, Houston, Tex.

Application August 31, 1954, Serial No. 453,323

3 Claims. (Cl. 64—32)

This invention relates generally to protective devices for bell housings and associated mechanisms of automotive vehicles, and relates more specifically to improvements in sealing mechanisms particularly adapted to reduce wear and lengthen the life of bell housing assemblies and their associated mechanisms, the specific use of the device being in association with those final drive assemblies of automotive vehicles of the torque tube type.

Considerable difficulty has been occasioned in torque tube drives, such as those produced and utilized in Chevrolet automobiles, GMC trucks and the like, due to the fact that the universal connection between the forward end of the drive shaft assembly and the rearward end of the transmission housing is so disposed that a considerable amount of dirt, grit and other abrasive foreign material is thrown upon or splashed upon the bell housing and sliding joint connection at this point which not only produces a considerable amount of wear in the bell housing and sliding joint connections, but also causes considerable wear upon the internal rotating parts housed within the torque tube assembly, particularly the front bushing assembly which journals the forward end of the drive shaft within the torque tube housing. Thus, such assemblies are notoriously short lived and have been in the past a source of frequent trouble and a necessary object of frequent repair.

Accordingly, it is the primary object of this invention to provide an external boot or cover for universal joint bell housings which provides an external and completely covering protector therefor.

It is another object of this invention to provide an improved boot or cover for bell housings which is so constructed as to assure proper positioning of the cover and prevent any longitudinal shifting thereof during operation of the associated vehicle.

Still another object of this invention is to provide an improved bell housing cover member which is provided with an internal collar lock mechanism for cooperation with the seal collar disposed at the rearward end of a bell housing, such as to properly position and locate the cover with respect to its associated operating parts of the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
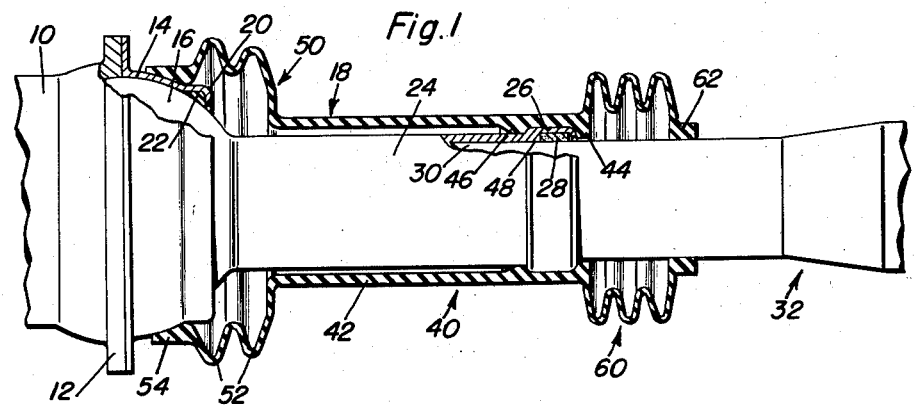
Figure 1 is an elevational view of a portion of the final drive assembly of an automotive vehicle showing a rearward portion of the transmission case, the bell housing and the forward end of the torque tube and showing the cover, in section, in operative position thereon.
Figure 2:
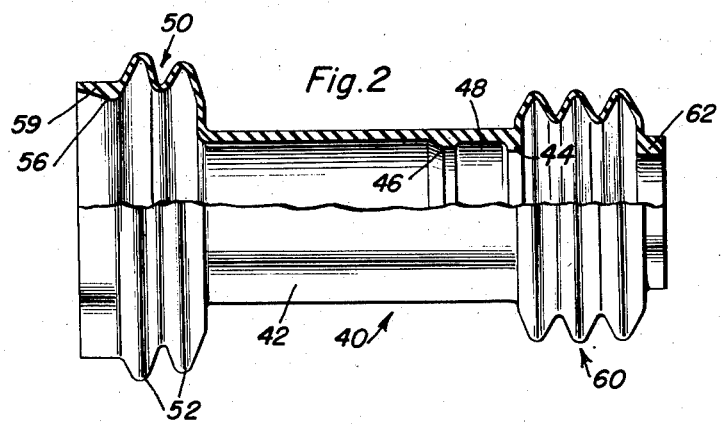
Figure 2 is an elevational view partly broken away showing the cover mechanism.
Figure 3:
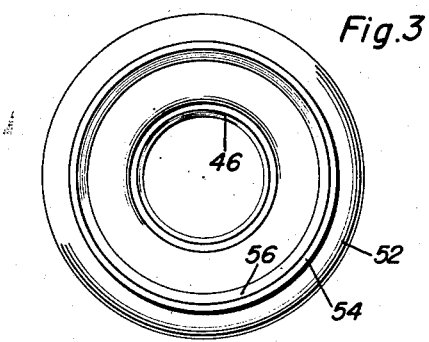
Figure 3 is a front elevational view of the cover assembly.

Referring now more particularly to the drawings, reference numeral 10 indicates the rearward portion of a transmission case which terminates in a flanged portion 12 to which the bell housing cap member 14 is rigidly secured in a well known manner. The bell housing cap embraces the torque ball portion 16 of the bell housing assembly indicated generally by the reference character 18 and has a recessed collar portion 20 thereon which receives an annular strip of sealing material 22, usually constructed of cork, which bears against the outer surface of the torque ball and simultaneously provides a grease and dust seal therefor. The bell housing includes the sleeve portion 24 projecting rearwardly from the torque ball 16 and which terminates in an enlarged collar portion 26 forming a recess within which an annular strip of sealing material 28, similar to the material 22, is placed. Slidably and guidably received within the sleeve portion 24 of the bell housing is the forward end 30 of the torque tube indicated generally by the reference character 32. This forward portion of the torque tube is of uniform diameter and is fitted to close tolerances within the sleeve portion 24 of the bell housing.

The above described assembly is of entirely conventional construction, and the specific embodiment illustrated is of the type utilized on Chevrolet automobiles and some Chevrolet trucks. The differential and axle housing assemblies are rigidly secured to the rearward end of the torque tube 32, whereas the transmission case 10 is more or less rigidly mounted with the frame of the vehicle such that when relative vertical movement between the rear driving wheels of the vehicle and the frame occurs, due to the arcuate path described by the rear wheels during such movement, an in and out sliding action will occur between the torque tube portion 30 and the sleeve 24, and a swivel action will occur between the torque ball 16 and its associated cover member 14. Although the seal members 22 and 28 are intended to wipe the swiveling and sliding surfaces of the assembly, they cannot contend with the great amount of grit and foreign material normally adhering to the associated surfaces with the result that the foreign material will work in between the sliding and swiveling surfaces and wear them away. In this respect also, foreign material will become embedded within the seal members 22 and 28 themselves, such that an abrasive action is occasioned which tends to destroy proper fitting and interengagement between the parts.

For the purpose of thoroughly protecting the entire assembly and preventing the entrance of foreign material and dirt thereinto, the boot or cover assembly indicated generally by the reference character 40 is provided. The cover or boot consists of an elongated tubular body portion 42 which is of slightly greater internal diameter than the external diameter of the sleeve portion 24 of the bell housing, and which is provided at its rearward end with an internal annular rib 44 which extends to a point closely adjacent to but not in actual contact with the outer surface of the forward end portion 30 of the torque tube, as shown most clearly in Figure 1. Disposed forwardly of and in spaced relation to the annular rib 44 is a second annular rib 46 whose internal diameter is such as to grip upon the outer surface of the body portion 24 of the bell housing in the manner shown. The two internal ribs 44 and 46 present an annular recess 48 therebetween which receives the collar 26 of the bell housing and forms a lock between the boot or cover 40 and the bell housing 18.

The cover is provided with an enlarged forward end portion 50 which is in the form of a bellows due to the corrugations 52 formed therein and the forward extremity of this portion terminates in the flange portion 54 whose inner surface 56 is arcuated to conform with the exterior surface of the ball cap 14. The internal diameter of the flange 54 is of such dimension as to firmly engage upon and grip the ball cap 14 so that the boot is held in the position shown most clearly in Figure 1.

At the rear end of the boot is the corrugated portion 60 which, like the forward end portion 50, provides a bellows. The rear extremity of the portion 60 terminates in a gripping flange portion 62 which snugly engages the outer surface of the torque tube portion 30.

In operation, it will be seen that the ribs 44 and 46 are lockingly engaged about the collar 26 of the bell housing 18, and the flanges 54 and 62 snugly engaged upon the ball 14 and the torque tube respectively. Thus, the cover assembly 40 is securely fixed at three separate points to the ball 14, the bell housing 18 and the torque tube 32 respectively. During normal operation of the associated vehicle, as the rear driving wheels thereof move relative to the frame, the corrugations 52 in the forward portion 50 of the cover 40 will permit the swiveling action between the bell housing and the transmission assembly 10 whereas the corrugations in the rear portion 60 of the cover will permit relative sliding movement between the torque tube and the bell housing. Since the flanges 54 and 62 are in firm and snug engagement with the ball cap and the torque tube respectively, the swiveling and sliding surfaces are completely enclosed and entrance of foreign material such as dirt or the like is obviated.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In a bell housing boot, an elongated tubular body adapted to fit loosely upon the sleeve portion of a bell housing assembly, a pair of spaced annular ribs formed on the interior surface of said body presenting an annular recess therebetween adapted to receive the rear collar of a bell housing assembly, said body having forward and rear extensions in the form of bellows, each terminating in a flange for snugly engaging upon a ball cover and the forward end of a torque tube respectively.

2. In a torque tube assembly including a ball cover, a bell housing having a ball swively received in said cover and an elongated sleeve portion extending therefrom terminating in a collar, and a torque tube having a forward end portion slidably received in said sleeve portion, a boot for sealing said torque tube assembly, said boot including an elongated body fitting about said sleeve portion and provided with a recess receiving said collar, a forward bellows extension integral with said body and terminating in a flange snugly engaged upon said ball cover, and a rear bellows extension integral with said body and terminating in a flange snugly engaged upon the torque tube.

3. In a torque tube assembly including a ball cover, a bell housing having a ball swively received in said cover and an elongated sleeve portion extending therefrom terminating in a collar, and a torque tube having a forward end portion slidably received in said sleeve portion, a boot for sealing said torque tube assembly, said boot including an elongated tubular body adapted to fit loosely upon said sleeve portion, a pair of annular ribs formed on the interior surface of said body on opposite sides of said collar, said body having forward and rear corrugated extensions, each terminating in a flange for snugly engaging upon said bell cover and said torque tube respectively.

References Cited in the file of this patent

UNITED STATES PATENTS

| | | |
|---|---|---|
| 2,308,073 | Hagerty | Jan. 12, 1943 |
| 2,473,618 | Stillwagon, Jr. | June 21, 1949 |